(12) United States Patent
Crawford et al.

(10) Patent No.: US 8,506,844 B2
(45) Date of Patent: *Aug. 13, 2013

(54) RARE-EARTH DOPED FLUORIDES AND PROCESS FOR PREPARING

(75) Inventors: Michael Karl Crawford, Glen Mills, PA (US); Kurt Richard Mikeska, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/328,213

(22) Filed: Dec. 16, 2011

(65) Prior Publication Data

US 2012/0319046 A1 Dec. 20, 2012

Related U.S. Application Data

(63) Continuation of application No. 11/954,251, filed on Dec. 12, 2007, now Pat. No. 7,901,593.

(51) Int. Cl.
*C09K 11/61* (2006.01)

(52) U.S. Cl.
USPC .................................. 252/301.4 H

(58) Field of Classification Search
USPC .................................. 252/301.4 H
See application file for complete search history.

(56) References Cited

U.S. PATENT DOCUMENTS

| | | | | |
|---|---|---|---|---|
| 3,203,899 | A * | 8/1965 | Fisher | 252/62.51 R |
| 6,861,012 | B2 | 3/2005 | Gardner et al. | |
| 7,517,564 | B2 * | 4/2009 | Crawford et al. | 427/558 |
| 7,901,593 | B2 * | 3/2011 | Crawford et al. | 252/301.4 H |
| 7,938,984 | B2 * | 5/2011 | Crawford et al. | 252/301.4 H |
| 2002/0027412 | A1 | 3/2002 | Yoshida et al. | |
| 2003/0032192 | A1 | 2/2003 | Haubold | |
| 2005/0068395 | A1 | 3/2005 | Haubold et al. | |
| 2005/0143249 | A1 | 6/2005 | Ross et al. | |
| 2007/0108413 | A1 | 5/2007 | Chi et al. | |
| 2008/0025896 | A1 | 1/2008 | Chi et al. | |

FOREIGN PATENT DOCUMENTS

| | | |
|---|---|---|
| EP | 0 147 252 A1 | 7/1985 |
| EP | 1 728 763 A2 | 12/2006 |
| EP | 1 884 553 A2 | 2/2008 |
| WO | WO 03/052025 A1 | 6/2003 |

OTHER PUBLICATIONS

Fedorov et al, "Crystallization of a Solid Solution with Fluorite Structure in the CaF2-SrF2-NdF3 System in the Vicinity of the Saddle Point on the Liquidus Surface", Doklady Akademii Nauk. 369(2):217-219, 1999.*
Martin et al., Atomic Energy Levels—The Rare-Earth Elements, U.S. Department of Commerce, National Bureau of Standards, 1978, (Book Not Included).
Sarma et al., Ionic Conductivity of CaF2-SrF2 Mixed Crystals, Solid State Ionics, 1990, vol. 42:227-232.
Federov et al., Crystallization of a Solid Solution With Fluorite Structure in the CaF2-SrF2-NdF3 System in the Vicinity of the Saddle Point on the Liquidus Surface, Dolady Akademi Nauk., 1999, vol. 369:217-219.
K. Kawano et al., Photoluminescence of Eu2+ ION Doped Into CA1-Sr f2 Mixed Crystlas, Japanese Journal of Applied Physics, 1990, vol. 29:319-321.
F. Wang et al., Synthesis and Luminescence Behavior of Eu3+ doped CaF2 Nanoparticles, Solid State Communications, 2005, vol. 133:775-779.
E. Faulques et al., Synthesis, Fabrication, and Photoluminescence of CaF2 Doped With Rare Earth Ions, Journal of Fluorescence, 1998, vol. 8:283-287.
Anonymous: Influence of Oxide Concentration on the Image Storage Efficiency of BaFBr Phosphor Materials, Research Disclosure 33641, 1992, vol. 336, Issue No. 41, Mason Publications.

* cited by examiner

*Primary Examiner* — Carol M Koslow

(57) ABSTRACT

The present invention is directed to rare-earth doped solid state solutions of alkaline earth fluorides having novel luminescence properties, and to a process for preparing them. The invention is useful as identifying markers on articles. Other uses include phosphors for plasma displays, optical frequency multipliers, optical amplifiers and the like.

10 Claims, 4 Drawing Sheets

US 8,506,844 B2

RARE-EARTH DOPED FLUORIDES AND PROCESS FOR PREPARING

FIELD OF THE INVENTION

The present invention is directed to rare-earth doped alkaline earth fluorides having novel luminescence properties, and to a process for preparing them. The invention is useful as identifying markers on articles. Other uses include phosphors for plasma displays, optical frequency multipliers, optical amplifiers and the like.

BACKGROUND OF THE INVENTION

Luminescent rare-earth doped alkaline-earth fluorides have long been known, and have been employed for numerous purposes such as scintillation detectors and laser materials. $CaF_2$ doped with such rare-earth species as $Eu^{+3}$, $Er^{+3}$, $Tb^{+3}$ are well-known compositions. It is well-known that a rare-earth doped alkaline earth fluoride will exhibit luminescence when exposed to ultraviolet light.

Each rare-earth element when incorporated into an alkaline earth host lattice such as $CaF_2$ exhibits a characteristic excitation spectrum; see, for example, FIG. 1 (101), and a characteristic emission or luminescence spectrum that depends upon the excitation wavelength employed; see, for example, FIG. 1 (102). The excitation spectrum is determined by monitoring the luminescence intensity at one wavelength while the specimen is illuminated over a range of wavelengths. The luminescence spectrum is determined by illuminating the specimen at a single wavelength corresponding to a peak in the excitation spectrum and determining the luminescence spectrum by scanning a detector over a range of wavelengths.

As shown in the figures, each such spectrum consists of a plurality of peaks at different wavelengths of light. The wavelengths at which the peaks occur are characteristic of each rare-earth element. No two rare-earth elements exhibit the same excitation or emission spectra; that is, the peaks in their spectra do not in general arise at the same wavelengths. To obtain luminescence, the rare-earth element must be excited by a light source that emits light at a wavelength corresponding to the location of one of the peaks in the excitation spectrum thereof. In general, the peaks in any one spectrum of rare-earth elements differ from one another in height or intensity, these differences in intensity being characteristic of the rare-earth element under particular conditions of measurement. These and related matters are all well-documented in the art. See for example, Martin et al., *Atomic Energy Levels—the Rare-Earth Elements*, U.S. Department of Commerce, National Bureau of Standards (1978).

Copending application 60/687646 discloses a room temperature aqueous solution based method for preparing rare-earth doped alkaline earth fluoride nanoparticles.

Sarma et al., Solid State Ionics 42, 227 (1990) discloses solid state solutions of $CaF_2$ and $SrF_2$. No mention is made of rare-earth doping.

Federov et al., Doklady Akademii Nauk. 369(2):217-219, 1999, discloses solid solutions consisting of a series of 10 mm diameter and 50 mm long single crystals of $(Ca_{1-y}Sr_y)_{1-x}Nd_xF_{2+x}$ grown by the Bridgman-Stockbarger method by crystallization from the melt.

Considerable effort in the art is being directed towards developing luminescent compositions for use as identifying marks on commercial goods, including packages, manufactured articles, and even money. One idea is to place an identifying mark on a manufactured article which will attest to its authenticity in the face of rampant piracy on a global scale. The mark is ideally invisible until inquiry is made using a particular wavelength of light which then stimulates luminescence with a characteristic spectrum.

A simple luminescent security mark may itself be easy to counterfeit. The present invention provides a family of novel rare-earth-doped alkaline earth fluorides, and a process for preparing them, that are characterized by unique luminescence peak intensity ratios, making it extraordinarily difficult to counterfeit security marks comprising these compositions.

SUMMARY OF THE INVENTION

The present invention provides a composition comprising a rare-earth-doped solid-state solution of alkaline earth fluorides represented by the chemical formula

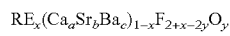

wherein RE represents a three-valent rare-earth element, $0.005 \leq x \leq 0.20$, and $0 \leq y \leq 0.2$, $a+b+c=1$, with the proviso at least two of a, b, and c are not equal to zero; the composition exhibiting a luminescence spectrum having a plurality of luminescence peaks at characteristic wavelengths, at least one pair of the luminescence peaks exhibiting an intensity ratio with respect to one another that differs by at least 5% from the corresponding intensity ratio of a corresponding reference composition.

The present invention further provides a process comprising combining an aqueous solution of an ammonium fluoride or hydrogen fluoride, or mixtures thereof, with one or more aqueous solutions of the salts of at least two alkaline earth metals, and an aqueous solution of a salt comprising a 3-valent rare earth metal cation, the amount of the rare-earth metal cation being in the range of 0.5 to 20 mol-% of the molar concentration of the total alkaline earth metal cation content, thereby forming a reaction mixture from which is formed a precipitate of a rare-earth doped solid state solution of alkaline earth fluorides represented by the formula

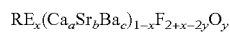

wherein RE represents a three-valent rare-earth element, $0.005 \leq x \leq 0.20$, and $0 \leq y \leq 0.2$, $a+b+c=1$, with the proviso at least two of a, b, and c are not equal to zero; the rare-earth doped multi-valent metal fluoride being characterized by an aqueous solubility of less than 0.1 g/100 g of water.

Further provided is a process comprising heating in the presence of oxygen a composition comprising a rare-earth-doped solid-state solution of alkaline earth fluorides represented by the chemical formula

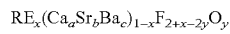

wherein RE represents a three-valent rare-earth element, $0.005 \leq x \leq 0.20$, and $0 \leq y \leq 0.2$, $a+b+c=1$, with the proviso at least two of a, b, and c are not equal to zero; to a maximum temperature in the range of 200° C. to 1000° C. followed by cooling, with the proviso that the composition so heated has not previously been exposed to the maximum temperature.

DETAILED DESCRIPTION

Figure 1:
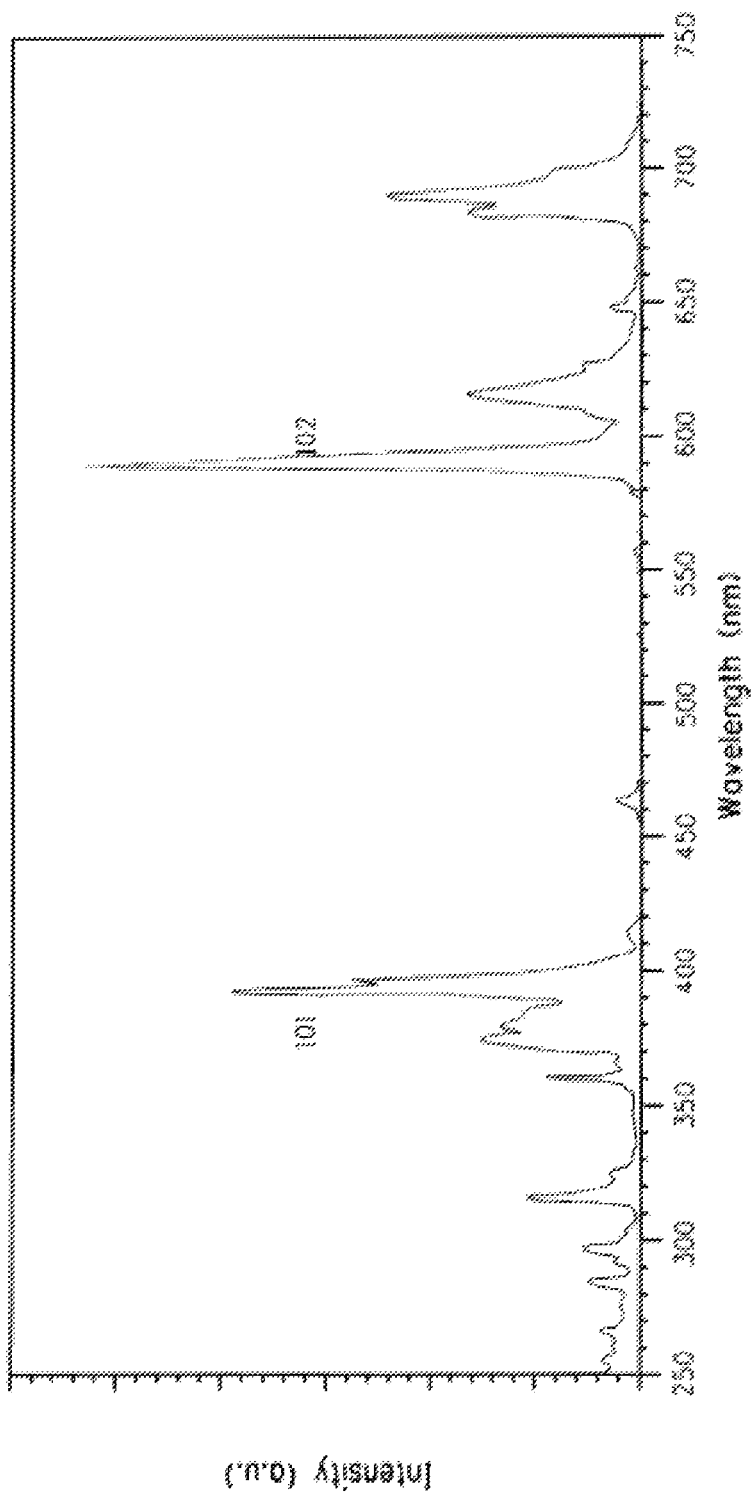
FIG. 1 is an excitation spectrum of $Eu_{0.05}Ca_{0.95}F_{2.05-2y}O_y$. Observed at 591 nm and a luminescence spectrum of $Eu_{0.05}Ca_{0.95}F_{2.05-2y}O_y$ excited at 394 nm.

The present invention provides a composition comprising a rare-earth-doped solid-state solution of alkaline earth fluorides represented by the chemical formula $$RE_x(Ca_aSr_bBa_c)_{1-x}F_{2+x-2y}O_y$$

wherein RE represents a three-valent rare-earth element, $0.005 \leq x \leq 0.20$, and $0 \leq y \leq 0.2$, a+b+c=1, with the proviso at least two of a, b, and c are not equal to zero; the composition exhibiting a luminescence spectrum having a plurality of luminescence peaks at characteristic wavelengths, at least one pair of the luminescence peaks exhibiting an intensity ratio with respect to one another that differs by at least 5% from the corresponding intensity ratio of a corresponding reference composition.

For the purpose of the present invention the term "solid state solution" is employed to refer to a composition such as but not limited to $Sr/CaF_2:EuF_3$, that forms a single crystalline phase as indicated by x-ray diffraction (XRD) analysis whereas a simple mixture of, e.g., a $SrF_2$: $EuF_3$ and a $CaF_2$: $EuF_3$ is shown by XRD to consist of multiple crystalline phases. XRD of the crystalline solid solutions of the invention reveals a well-defined crystallographic lattice parameter that is observed to vary linearly with mole fraction of Sr (x) in $Ca_{0.98-x}Sr_xF_2:Eu_{0.02}$ as shown in the specific embodiments infra. This linear dependency is known to be a characteristic of solid solutions based upon Vegard's Law (see the descriptions of solid solutions and Vegard's Law given, for example, in the standard text Structural Inorganic Chemistry by A. F. Wells, Oxford University Press, 1962, third edition). In contrast, the XRD pattern for a simple mixture of, e.g., a $SrF_2$: $EuF_3$ and a $CaF_2:EuF_3$ that is a simple linear superposition of the XRD patterns of separate constituent phases, each weighted by its respective volume fraction.

The compositions of the present invention may conveniently be prepared according to the precipitation process and, if desired, the heating process of the invention, described, infra. However, the composition is not limited in scope to any particular means of preparation. For the purposes of the present invention, the process by which the composition is synthesized shall be known as the "precipitation process." Any embodiment of the composition that has not been exposed to a temperature above 100° C. shall be referred to as an "as-precipitated" embodiment regardless of whether that embodiment was actually prepared by precipitation.

The composition of the invention has many embodiments that differ from one another, inter alia, by virtue of the particular rare-earth, and the particular alkaline earth cations incorporated therein, as well as by the relative amounts thereof, that is, by the values of x, a, b, and c. To each embodiment there corresponds a so-called "reference composition." The reference composition is a solid state solution consisting of the same rare-earth and alkaline earths in the same relative amounts as the embodiment to which it corresponds; that is, RE, x, a, b, and c are the same as in the embodiment to which it corresponds. However, unlike an embodiment, that is prepared according to the process, the reference composition corresponding thereto is prepared by crystallization from the melt in the manner of Federov, op. cit. Each embodiment, and each reference composition corresponding thereto, is characterized by a luminescence spectrum having a plurality of luminescence peaks at characteristic wavelengths. Any pair of the plurality of luminescence peaks is characterized by the ratio of the intensities (or heights) thereof. According to the present invention, for each embodiment, there is at least one pair of the plurality of peaks whereof the ratio of the intensities (or intensity ratio) differs by at least 5% from the intensity ratio of peaks at the same wavelengths in the luminescence spectrum of the corresponding reference composition.

The rare-earths suitable for the practice of the invention include all the members of the Lanthanide series in the periodic table of the elements with the exception of promethium and lutetium. The rare-earth elements are all in the +3-valent state. Eu+3, Er+3, and Tb+3 are preferred.

In a further embodiment $0.01 \leq x \leq 0.10$.

In another embodiment, one of a, b, or c=0. In a still further embodiment, a=0.01 to 0.99, b=0.99 to 0.01, and c=0. In a further embodiment, a=0.25 to 0.75 and b=0.75 to 0.25, while c=0.

In a further embodiment, RE is $Eu+3$, $Er^{+3}$, or $Tb^{+3}$, $0.01 \leq x \leq 0.10$, a=0.01 to 0.99, b=0.99 to 0.01, and c=0, In a still further embodiment the rare earth-doped solid state solution of alkaline earth fluorides is represented by the chemical formula $Eu_{0.02}(Ca_{0.50}Sr_{0.50})_{0.98}F_{2.02-2y}O_y$, where $0 \leq y \leq 0.2$.

The composition is not limited to any particular method by which it is prepared.

The present invention further provides a process comprising combining an aqueous solution of an ammonium fluoride, hydrogen fluoride, or mixtures thereof, with one or more aqueous solutions of the salts of at least two alkaline earth metals, and an aqueous solution of a salt comprising a 3-valent rare earth metal cation, the amount of the rare-earth metal cation being in the range of 0.5 to 20 mol-% of the molar concentration of the total alkaline earth metal cation content, thereby forming a reaction mixture from which is formed a precipitate of a rare-earth doped solid state solution of alkaline earth fluorides represented by the formula $$RE_x(Ca_aSr_bBa_c)_{1-x}F_{2+x-2y}O_y$$

wherein RE represents a three-valent rare-earth element, $0.005 \leq x \leq 0.20$, and $0 \leq y \leq 0.2$, a+b+c=1, with the proviso at least two of a, b, and c are not equal to zero; the rare-earth doped multi-valent metal fluoride being characterized by an aqueous solubility of less than 0.1 g/100 g of water.

The reaction in aqueous solution of the soluble fluoride with the soluble alkaline earth salts and rare earth salt is very rapid. Precipitation occurs so quickly in the process of the invention that there is little time for crystal growth after nucleation except in highly dilute solution and low supersaturation.

The particles produced according to the present invention comprise a crystalline or semi-crystalline host material and a dopant. The host material is a solid state solution of at least two alkaline earth fluorides characterized by an aqueous solubility of less than 0.1 g/100 g of water. The dopant is a three-valent rare-earth cation which occupies specific lattice sites in the crystalline structure of the host material.

According to the present invention an aqueous solution of ammonium fluoride is combined with one or more aqueous solutions of the salts of at least two alkaline earth metals, and an aqueous solution of a rare earth metal salt. The aqueous solubility of the resulting rare-earth doped solid state solution of two or more alkaline earth fluorides is less than 0.1 g/100 g at room temperature.

The term "rare-earth" refers to members of the Lanthanide Series in the periodic table, namely La, Ce, Pr, Nd, Sm, Eu, Gd, Tb, Dy, Ho, Er, Tm, and Yb.

Preferred anions for a soluble alkaline earth metal salt suitable for the process hereof include chloride, nitrate, sulphate, hydroxide, acetate, carbonates, phosphates, bromides, and hydrates thereof.

The process can be employed to make both nano-scale particles and micro-scale particles, depending upon the reaction conditions. For the purpose of the present invention, the term "nano-scale" shall be understood to refer to a batch of particles of which fewer than 50%, preferably fewer than 90%, of the particles by weight are trapped in a 200 nm filter. It has been found in the practice of the invention that a 0.2 micrometer Zapcap-CR chemically resistant bottle top filter available from Schleicher & Schueel Microscience, is satisfactory for this determination.

For the purpose of the present invention, the term micro-scale shall be understood to refer to a batch of particles of which at least 50%, preferably at least 90%, of the particles by weight are trapped in a 500 nm filter. Particles to be micro-sized shall be further characterized in that fewer than 50%, preferably fewer than 90%, of the particles by weight are trapped in a 200 micrometer filter.

Three processes are involved in the precipitation of a solid product from a homogenous reaction solution. (1) chemical reactions that produce supersaturation, (2) nucleation of particles and (3) and growth of particles.

For fast reactions, such as occur herein, small particles are produced when there is a localized high concentration of the crystallizing species in solution and high supersaturation, which results in high nucleation rates, high nuclei densities, and low growth rates. Large particles are produced by reducing the local solution supersaturation, which decreases the nucleation rate and increases the growth rate.

From a processing standpoint, final particle size can be influenced by controlling initial reactant concentrations, crystallizing species concentration (supersaturation) and mixing conditions.

It was observed in the practice of the present invention that increasing the concentration of the rare-earth dopant decreases the size of the particle produced according to the present invention. As a general guideline, preparation of nano-scale particles is beneficially accomplished by employing reactant concentrations of >0.01 N, preferably in the range of 0.1N to 0.8N, while preparation of micro-scale particles is beneficially accomplished by employing reactant concentrations of <0.01 N. Nano-scale particles may beneficially be prepared by direct mixing of the precursor solutions as in a T-mixer or by some other form of direct mixing. In these cases the local supersaturation is high resulting in high nucleation rates, low growth rates and nano-scale particles. While micro-scale particles can also be prepared by direct mixing of highly dilute solutions, it is more convenient to combine about 1N solutions of the reactants in a well-stirred aqueous bath that provides a dilution factor of ca. 100-200 times—for example combining 1 liter of 2N of each alkaline earth chloride, and the appropriate amount of $EuCl_3$, and $NH_4F$ in 120 liters of well-stirred water has been found to be satisfactory for preparing micro-scale particles. In these cases the local supersaturation is low resulting in low nucleation rates, high growth rates and micron size scale particles. It is important to stir the reaction vessel to effectively reduce the local supersaturation.

The process of the present invention is also applicable to the preparation of nano-scale and micro-scale mixed fluoride salts which are undoped with rare earth. For instance, the process of the present invention can be used to prepare nano-scale and micro-scale particles of undoped $SrCaF_2$.

Soluble salt starting materials need only be soluble enough to form aqueous solutions of the desired concentrations for the purposes of the present invention. From the standpoint of the present invention, a salt is to be aqueously soluble if a solution of the desired concentration can be formed from it.

For the production of nano-scale particles, it is convenient to combine the reactants in a T-mixer on a continuous or semi-continuous basis. Reaction is essentially instantaneous, with nano-particulate precipitate forming in the output leg of the T as the reaction stream flows into the collector vessel. For production of micro-scale particles, the highly diluted ingredients, with concentrations of <0.01 N, may need to be allowed to stand and react while being stirred for about 30 minutes. The pH of the reaction mixture is preferably maintained close to neutral, but a pH range from about 1 to 11 is acceptable.

Following reaction and product precipitation, the product may be conveniently separated by centrifugation and decanting of the supernatant liquid. The isolated "wet cake" so produced may then be redispersed in water (or organic solvents by a solvent exchange process) by mixing with liquid and subjecting the mixture to ultrasonic agitation for a period of 5-30 minutes. The dispersed particles are then in a form well-suited to use in coatings and the like. For dispersion in non-polar solvents, it may be required to combine the particles produced with surfactants, as taught in the art.

Other suitable methods of separating the precipitate include ion exchange, dialysis or electrodialysis which substantially eliminates all salts produced in the process. Further methods, to separate and concentrate the sample, include evaporation of water, centrifugation, ultrafiltration, electrodecantation. A preferred procedure is to employ ion exchange resins to remove soluble salt residues followed by evaporation to concentrate the colloidal sol produced in the process.

It is preferred that the particles prepared in the process of the invention be subject to water washing in order to remove any residual water soluble starting materials. Dispersing in water followed by centrifugation is one effective method.

The resulting particles exhibit luminescence when subject to suitable optical excitation. It has been found that thermal post-treatment from about 200° C. to 1000° C. may alter luminescence intensity or lifetime.

When a composition comprising a rare-earth-doped solid-state solution of alkaline earth fluorides represented by the chemical formula

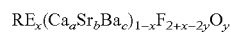

wherein RE represents a three-valent rare-earth element, $0.005 \leq x \leq 0.20$, and $0 \leq y \leq 0.2$, $a+b+c=1$, with the proviso at least two of a, b, and c are not equal to zero, that has been synthesized at a temperature below about 100° C., is heated in the presence of oxygen in the temperature range from 200-1000° C., it gives rise to a family of novel rare-earth-doped alkaline earth fluorides that differ from one another in their luminescence peak intensity ratios. Each member of the family exhibits a luminescence spectrum having a plurality of luminescence peaks at characteristic wavelengths. At least one pair of the luminescence peaks exhibits an intensity ratio that differs by at least 5% from the corresponding intensity ratio of the corresponding reference composition, described supra.

While not limiting, it is found in the heating process of the invention, that upon heating to a temperature in the range of 200-1000° C. in the presence of oxygen the value of y is observed to increase.

Every member of each such family of compositions exhibits a luminescence spectrum having a plurality of luminescence peaks at characteristic wavelengths. For each family of compositions according to the present invention, there exists at least one pair of the peaks, the relative intensities of which change depending upon the temperature/time profile to which the as-precipitated composition, described supra, is subjected. The heated compositions are characterized by at least one peak intensity ratio that differs by at least 5% from the corresponding peak intensity ratio of the corresponding reference composition as well as from the as-precipitated composition. The term "corresponding peak intensity ratio" refers to the peak intensity ratio of the same peaks in the corresponding reference composition as that of the peaks in the composition of the invention to which peak intensity ratio is being compared.

For the purposes of the present invention, a family of compositions is one in which all members thereof have the same rare-earth element at the same concentration, x; the same alkaline earth elements at the same concentrations, a(1−x), b(1−x), c(1−x); fluorine and oxygen, and wherein members are usually differentiated from one another by the value of y as well as by the relative peak intensity ratio of at least one pair of luminescence peaks.

In one embodiment of the heating process of the invention a compound represented by the chemical formula $Eu_{0.02}Ca_{0.49}Sr_{0.49}F_{2.02-2y}O_y$, wherein $0 \leq y \leq 0.2$ is synthesized at room temperature in a fully aqueous solution described supra. The as-synthesized composition is then subject to heating in air to several temperatures between 200 and 1000° C. to yield a family of compositions wherein $0 \leq y/x \leq 1$.

In another embodiment of the process of the invention a compound represented by the chemical formula $Eu_{0.02}Ca_{0.74}Sr_{0.24}F_{2.02-2y}O_y$, wherein y/x<0.05 is synthesized at room temperature in a fully aqueous solution described in copending U.S. application 60/687646. The as-synthesized composition is then subject to heating in air to several temperatures between 200 and 1000° C. thereby producing the family of compositions wherein $0 \leq y/x \leq 1$.

Other embodiments include but are not limited to applying the same process to similarly precipitated compositions such as $Eu_{0.02}Ca_{0.24}Sr_{0.74}F_{2.02y}O_y$, wherein $0 \leq y \leq 0.2$.

The as-precipitated compounds hereof are found to generally contain small amounts of oxygen which may arise from a variety of adventitious sources. However, the concentration of oxygen in the as-precipitated compounds is found in the practice of the invention to be small, with y/x<0.05. On the other hand, the heated compositions of the invention exhibit considerably larger oxygen concentrations.

The specific wavelengths of the emission peaks making up at least one peak intensity ratio of any particular composition of the invention depend upon the specific rare-earth element employed, and to a lesser degree to the host lattice—that is, the specific alkaline earth fluoride. However, all the compositions of the invention exhibit the same differentiating characteristic regarding peak intensity ratio changes.

The heating process of the invention can be performed in a series of heating steps as well as in a single heating step. For example, a composition as-precipitated can first be heated to, e.g., 300° C., cooled, and at a later time further heated to, e.g., 500° C. The sample heated to 500° C. can then again be cooled and at a later time heated further to a still higher temperature.

Regardless of the heating protocol followed, there is no specific minimum duration of heating except that the duration of heating of a particular composition at a particular temperature must be of sufficient length to cause a change of at least 5% in the peak intensity ratio of at least one pair of peaks in the luminescence spectrum.

The particular means employed for heating is not material to the operability of the invention. Suitable means for heating include but are not limited to pressure vessel heating of an aqueous dispersion (so-called hydrothermal heating), electrical resistance furnaces, oil baths, electrically heated crucibles, liquid metal baths, lasers, radio frequency induction furnaces, microwave cavities, gas fired furnaces, oil fired furnaces, solar furnaces. Preferred is an electrical resistance furnace. Typically, when heated in a bath, the as-synthesized powder is sealed in a pressure vessel of sufficient volume to leave a head-space comprising oxygen followed by immersion of the heated tube into the heating bath. When the as synthesized powder is subject to oven or furnace heating it can be heated in an open crucible.

It has been found satisfactory in the heating process of the invention to heat the composition suitable for the practice of the invention gradually to the desired final temperature such as by placing the specimen to be heated into a furnace at room temperature, and then heating to the desired end-point at a rate of 2-10° C./minute, preferably 4-6° C./min.

Heating is effected in the presence of oxygen. There are many potential sources for the oxygen. Heating can be effected in the air, or in an oxygen atmosphere. It is also possible for oxygen to be devolved from species employed or derived from the synthesis environment such as nitrates or hydoxyls. It is believed that even small amounts of oxygen contamination can be sufficient to effect the process.

It was found that the as-precipitated particles will undergo some degree of sintering or agglomeration during heating, particularly at the higher temperatures in the temperature range. Depending upon the particular exigencies of the end use intended, it can be desirable to subject the product of the process to a means for commination to smaller size. Media milling is one such method for reducing and/or homogenizing the particle size. Numerous other methods are known in the art.

The rare-earth-doped solid state solutions of alkaline earth fluorides can be combined with other ingredients to form compositions suitable for use as coatings or inks. In one embodiment, a composition is incorporated into an ink composition suitable for printing. In another embodiment, the composition is incorporated into a paint composition which can be applied by any method known in the art including by brushing, rolling, or spraying.

Numerous chemical formulations are known in the art for preparing inks, paints, and other coating compositions. Every such composition in the art that contains inorganic pigments in particulate form can be employed to formulate an ink, paint, or other coating composition with the composition of the invention serving as the pigment. The composition of the invention may serve as the only pigment, or it may be combined with other pigments and particulate matter such as is known in the art of inks and coatings.

In one formulation, an embodiment of the composition is incorporated into an ink or coating with no other pigment, thereby resulting in a luminescent coating that after application to the surface of an article is largely invisible to the eye until subject to UV excitation of luminescence.

The invention is further described in the following specific embodiments, but is not limited thereto.

EXAMPLES

Luminescence Spectra

The luminescence spectra in the examples below were determined using a Jobin-Yvon Spex Fluorolog spectrofluorometer. A 450 W Xe lamp was used as the excitation source. Gratings blazed at 330 nm with 1200 grooves/mm were used in the excitation monochromator. Gratings blazed at 500 nm with 1200 grooves/mm were used in the emission monochromator. A dry powder sample was loaded into a 15 mm long by 5 mm diameter quartz tube. The powder was tamped down to provide a smooth sample surface and the ends of the tube were sealed either with epoxy or cotton plugs. The sample tube was then loaded in a sample holder designed to hold these small tubes. Sample luminescence was measured from the front face of the tube, with an angle of 15° between the excitation and emission beams. A 400 nm low-pass filter was used to prevent the primary excitation beam in second or higher order of the emission monochromator from interfering with the results. Excitation and emission spectrometer bandwidths were 1 nm; spectrum step size was 1 nm; integration time was 0.1 second per data point. Data was corrected for the excitation Xe lamp intensity.

XRD

XRD data was obtained at DND-CAT at the Advanced Photon Source, Argonne National Laboratory, Argonne, Ill. The synchrotron beamline 5-ID-B includes an insertion device for high brilliance and operates at a fixed x-ray energy of 17 keV (wavelength of 0.7 Å) with a beam size of 0.5 mm×0.5 mm. Data were collected in Bragg-Brentano scattering geometry using a 2-circle Huber diffractometer over a two-theta (twice the scattering angle) range of 11-40 degrees. The experimental design included a Ge analyzer crystal for high angular resolution. The angle step size was between 0.001-0.015 degree two-theta, depending upon the crystallinity of the sample. Count time was one second per data point. The sample was loaded in a 1 mm diameter glass capillary that was rotated about its long axis at 1 degree/sec during data collection to improve powder averaging

Examples 1-3

In the amounts shown in Table 1 $CaCl_2.2H_2O$ (Sigma-Aldrich, 99.9%), $SrCl_2.6H_2O$ (Sigma-Aldrich, 99.9%) and $EuCl_3.6H_2O$ (Sigma-Aldrich, 99.9%) were stirred into 150 ml of deionized water in a polycarbonate Erlenmeyer flask for about 5 minutes to ensure dissolution of the solids.

Separately, $NH_4F$ (Alfa Aesar, ASC reagent 99%) was dissolved in the amounts shown in Table 1 by stirring into a further 150 ml aliquot of deionized water for about 5 minutes to ensure dissolution of the solids.

The prepared solutions were simultaneously but separately fed by a peristaltic pump at 10 ml/min through silicone rubber tubing into the two arms of a plastic tee (T). Teflon® tubing ran from the leg or output branch of the T into the product flask. A precipitate formed within the output branch of the T immediately beyond the point at which the two streams merged, forming a suspension in the water. The suspension formed was discharged into the product flask. During the discharge the flask containing the product suspension was stirred by magnetic stirring. After discharge was complete, the suspension was held static for about 24 hrs at ambient temperature. The resulting suspension was then centrifuged (Sorvall RC5C, Thermo Electron Corp.) at a relative centrifugal force of 9500×g for 40 min, and the supernatant (containing soluble salts) decanted and discarded. The residue was redispersed in a fresh aliquot of about 300 ml of deionized water using ultrasonic agitation (Sonics and Materials, Inc, Danbury, Conn.) at 50 W/cm². The resulting dispersion was again centrifuged and the supernatant again decanted and discarded.

The washed as precipitated powder residue was dried in a laboratory drying oven at 60° C. in air for 24 hrs to form 15.67 g of a dry powder compact The oven dried powder compact was then hand-ground in a mortar and pestle to from a uniform dry powder.

Figure 2:
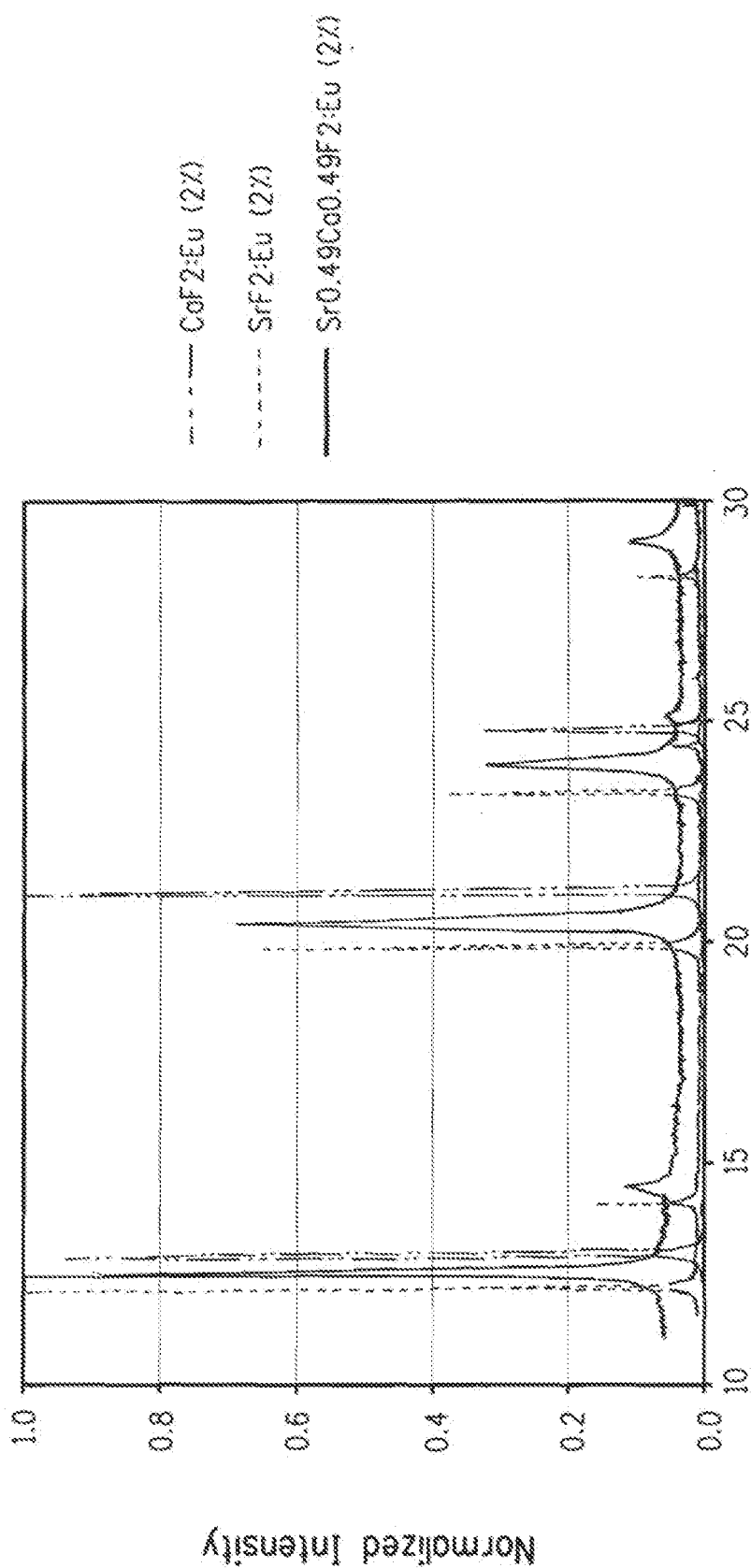
FIG. 2 illustrates a X-ray diffraction pattern of a precipitated composition of Example 2.

The X-ray diffraction pattern of the as precipitated composition of Example 2, $Eu_{0.02}Sr_{0.49}Ca_{0.49}F_{2.02-2y}O_y$, was determined, and is shown as the solid line in FIG. 2.

The luminescence spectrum of the as-precipitated material was determined by the procedure described supra, with the 589 nm/610 nm peak intensity ratios of each shown in Table 1.

Examples 4-6

A 15 g aliquot of each of the washed as precipitated powders from Examples 1-3 was redispersed in about 100 ml of deionized water using ultrasonic agitation. The washed 100 ml suspension was placed in a 100 ml screw cap flexible-walled Teflon® bottle. The bottle was filled right to the brim before placing the cap on in order to exclude air. The Teflon® container containing the suspension was placed in a stainless steel pressure reactor (filled with water) and heated for 6 hrs at 245° C. at a saturated vapor pressure of 568 psi. The resulting hydrothermally treated suspension was then centrifuged and decanted as described above. The wet powder residue was dried in a laboratory drying oven at 60° C. in air for 24 hrs to form a dry powder compact. The oven dried powder compact was then hand-ground in a mortar and pestle to from a uniform dry powder.

Figure 3A:
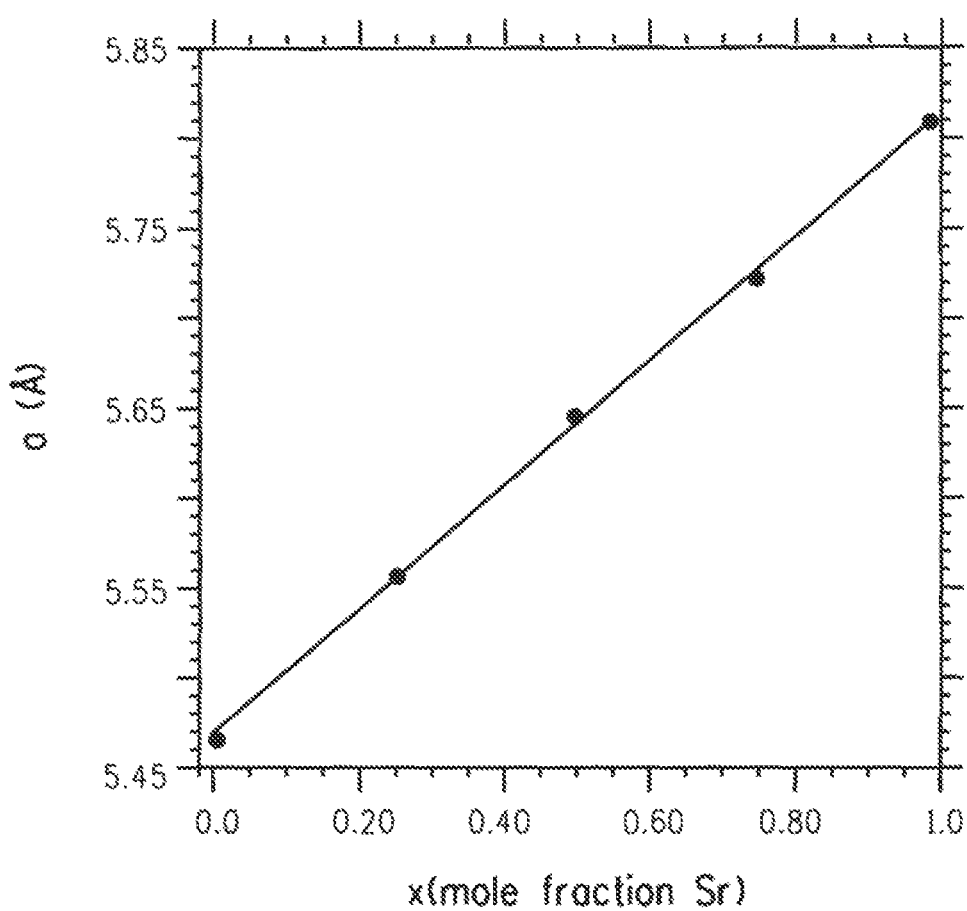
FIGS. 3A and 3B illustrate graphs of lattice parameters.

FIG. 3a shows a graph of the lattice parameter, a, determined by ordinary means known to one of skill in the art from the XRD analysis, of the product of the hydrothermal heating step of the process for each of the three compositions of Examples 1-3 as well as the pure Sr and Ca compositions of the comparative experiments. The linearity is indicative of a solid state solution.

The luminescence spectrum was determined as described supra. Peaks at 589 nm and 610 nm were discerned. Table 1 shows the 589/610 peak intensity ratios for the solid state solutions of Examples 4-6.

Examples 7-9

Fresh powder aliquots of the as-precipitated specimens prepared in Examples 1-3 were each placed in a covered alumina crucible which in turn was placed into a Fisher Isotemp Programmable Ashing Furnace, Model 497, at room temperature. The specimen was then heated in air at a programmed rate of 5° C./min to the 900° C., held isothermally for 1 hr, followed by cooling at 5C.°/min to room temperature. The oven fired powder compact was then hand-ground in a mortar and pestle to from a uniform dry powder.

Luminescence of each was determined as described supra, and results are shown in Table 1.

Figure 3B:
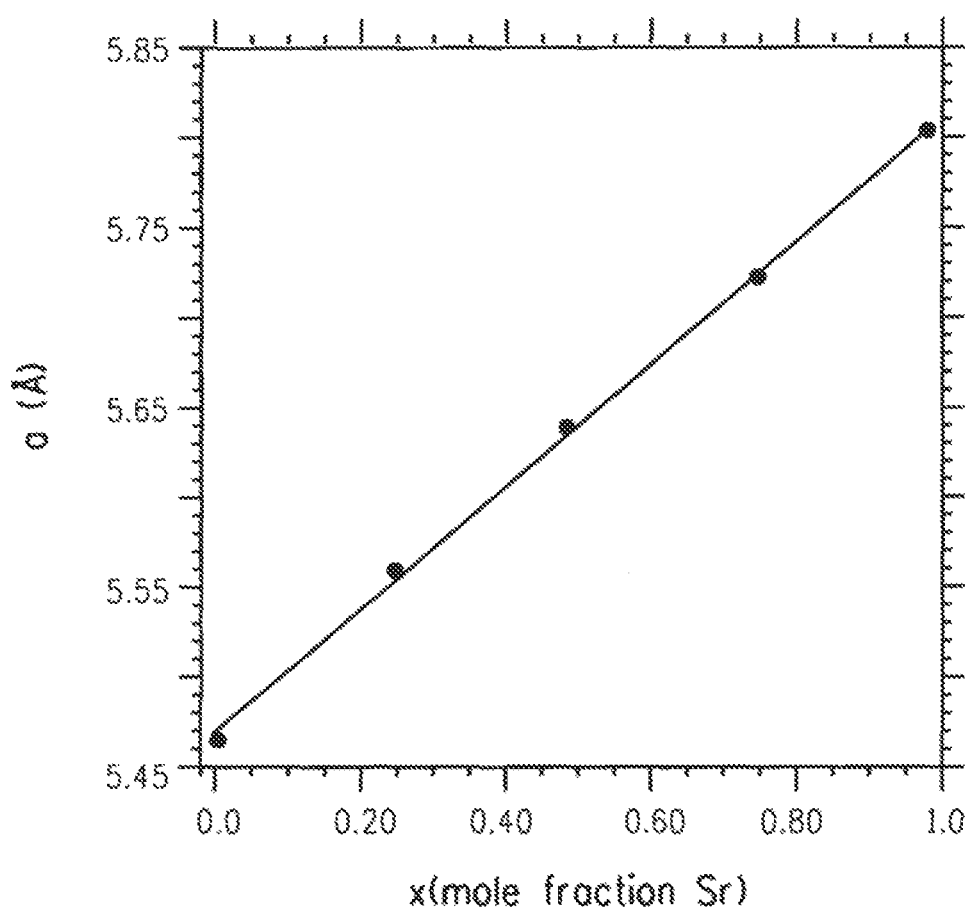

FIG. 3b shows a graph of the lattice parameter, a, determined by ordinary means known to one of skill in the art from the XRD analysis, of the product of the 900° C. heating step of the process for each of the three compositions of Examples 4-6 as well as the pure Sr and Ca compositions of the comparative experiments. The linearity is indicative of a solid state solution.

Example 10

7.2 gr of $CaCl_2.2H_2O$, 13.06 gr of $SrCl_2.6H_2O$ and 0.73 gr $EuCl_3.6H_2O$ were stirred into 1000 ml of deionized water in a polycarbonate Erlenmeyer flask for about 5 minutes to ensure dissolution of the solids.

Separately, 7.2 gr NH$_4$F was dissolved a further 1000 ml aliquot of deionized water for about 5 minutes to ensure dissolution of the solids.

A separate reaction vessel was charged with 1000 ml of pure deionized water. The reaction vessel with pure water was mechanically stirred with a 1.5" diameter impeller positioned near the bottom of the vessel.

The prepared salt solutions were simultaneously but separately fed by a peristaltic pump at 10 ml/min through silicone rubber tubing into the stirred reaction vessel containing pure water. The feed tubes were positioned on either side of the reaction vessel with the discharge end near the impeller in order to get good mixing. A white precipitate formed in the reaction vessel on discharge of the two salt solutions creating a particle-water suspension. During the discharge the reaction vessel containing the product suspension was continuously stirred. After discharge was complete, the suspension was held static for about 24 hrs at ambient temperature. Water was removed from the resulting suspension by filtering using a 0.5 micrometer filter (Zapcap-CR chemically resistant bottle top filter available from Schleicher & Schueel Microscience) where the suspended particles were captured on the filter media. The wet filter cake was then washed 2× by adding clean water to the filter cup and repeating the filter procedure.

The washed as precipitated powder residue was dried in a laboratory drying oven at 60° C. in air for 24 hrs to form 15.67 g of a dry powder compact The oven dried powder compact was then hand-ground in a mortar and pestle to from a uniform dry powder.

Comparative Examples A, B, and C

Each of two Mixture Components, $Eu_{0.02}Ca_{0.98}F_{2.02-2y}O_y$, shown as MC1 in Table 2, and $Eu_{0.02}Sr_{0.98}F_{2.02-2y}O_y$ shown as MC2 in Table 2, were prepared by the method of Examples 1-3 except that in each case only one alkaline earth chloride was employed in the preparation of each of the mixture components, as shown in Table 2. In FIG. 2 are the individual x-ray diffraction patters of $Eu_{0.02}Sr_{0.98}F_{2.02-2y}O_y$ and $Eu_{0.02}Ca_{0.98}F_{2.02-2y}O_y$, represented as broken lines.

One 15 g aliquot of each Mixture Component was separately hydrothermally heated as described above in Examples 4-6. Following heating and drying, the dried powders of the hydrothermally heated Mixture Components were combined in the molar ratios shown in Table 3 and then physically mixed together by grinding by hand in a mortar and pestle to form a uniform powder mixture.

Luminescence data was obtained as described supra, and is shown in Table 3.

Comparative Examples D, E, and F

One 15 g aliquot of each Mixture Component prepared in Comparative Examples A, B, and C was separately heated to 900° C. as described in Examples 3-6, supra. Following heating, cooling and grinding, the resulting powders of the two Mixture Components were again combined in the molar ratios shown in Table 3.

Luminescence data on the resulting mixtures was obtained as described supra, and is shown in Table 3.

TABLE 1

| Example | Reactants (g) | | | | Composition of Product | Maximum Exposure Temp. (C.) | 589/610 Peak Ratio |
| --- | --- | --- | --- | --- | --- | --- | --- |
| | CaCl$_2$•2H$_2$O | SrCl$_2$•6H$_2$O | EuCl$_3$•6H$_2$O | NH$_4$F | | | |
| 1 | 2.177 | 11.838 | 0.44 | 4.489 | $Eu_{0.02}Sr_{0.74}Ca_{0.24}F_{2.02-2y}O_y$ | 30 | 2.60 |
| 2 | 4.322 | 7.839 | 0.44 | 4.489 | $Eu_{0.02}Sr_{0.49}Ca_{0.49}F_{2.02-2y}O_y$ | 30 | 2.58 |
| 3 | 6.527 | 3.839 | 0.44 | 4.489 | $Eu_{0.02}Sr_{0.24}Ca_{0.74}F_{2.02-2y}O_y$ | 30 | 3.38 |
| 4 | 2.177 | 11.838 | 0.44 | 4.489 | $Eu_{0.02}Sr_{0.74}Ca_{0.24}F_{2.02-2y}O_y$ | 245 | 4.61 |
| 5 | 4.322 | 7.839 | 0.44 | 4.489 | $Eu_{0.02}Sr_{0.49}Ca_{0.49}F_{2.02-2y}O_y$ | 245 | 3.74 |
| 6 | 6.527 | 3.839 | 0.44 | 4.489 | $Eu_{0.02}Sr_{0.24}Ca_{0.74}F_{2.02-2y}O_y$ | 245 | 4.79 |
| 7 | 2.177 | 11.838 | 0.44 | 4.489 | $Eu_{0.02}Sr_{0.74}Ca_{0.24}F_{2.02-2y}O_y$ | 900 | 1.52 |
| 8 | 4.322 | 7.839 | 0.44 | 4.489 | $Eu_{0.02}Sr_{0.49}Ca_{0.49}F_{2.02-2y}O_y$ | 900 | 1.72 |
| 9 | 6.527 | 3.839 | 0.44 | 4.489 | $Eu_{0.02}Sr_{0.24}Ca_{0.74}F_{2.02-2y}O_y$ | 900 | 1.68 |

TABLE 2

| | Reactants | | | | Composition of Product |
| --- | --- | --- | --- | --- | --- |
| | CaCl$_2$•2H$_2$O (g) | SrCl$_2$•6H$_2$O (g) | EuCl$_3$•6H$_2$O (g) | NH$_4$F (g) | |
| MC1 | 0 | 15.667 | 0.44 | 4.489 | Eu(0.02)Sr(0.98)F(2.02 − 2y)O(y) |
| MC2 | 13.886 | 0 | 0.514 | 4.489 | Eu(0.02)Ca(0.98)F(2.02 − 2y)O(y)) |

TABLE 3

| | % $Eu_{0.02}Ca_{0.98}F_{2.02-2y}O_y$ | % $Eu_{0.02}Sr_{0.98}F_{2.02-2y}O_y$ | Maximum Exposure Temp. (C.) | 589/610 Ratio |
| --- | --- | --- | --- | --- |
| CE A | 83 | 17 | 245 | 3.13 |
| CE B | 62 | 38 | 245 | 3.65 |
| CE C | 35 | 65 | 245 | 4.26 |
| CE D | 83 | 17 | 900 | 2.20 |
| CE E | 62 | 38 | 900 | 2.60 |
| CE F | 35 | 65 | 900 | 2.84 |

What is claimed is:

1. A composition comprising a rare-earth-doped solid-state solution of alkaline earth fluorides represented by the chemical formula $$RE_x(Ca_aSr_bBa_c)_{1-x}F_{2+x-2y}O_y$$

wherein RE represents a three-valent rare-earth element, $0.005 \leq x \leq 0.20$, and $0 \leq y \leq 0.2$, a+b+c=1, with the proviso at least two of a, b, and c are not equal to zero; the composition exhibiting a luminescence spectrum having a plurality of luminescence peaks at characteristic wavelengths, at least one pair of the luminescence peaks exhibiting an intensity ratio with respect to one another that differs by at least 5% from the corresponding intensity ratio of a corresponding reference composition.

2. The composition of claim 1 wherein one of a, b, or c=0.

3. The composition of claim 1 wherein a=0.01 to 0.99, b=0.99 to 0.01, and c=0.

4. The composition of claim 1 wherein a=0.25 to 0.75, b=0.75 to 0.25, and c=0.

5. The composition of claim 1 wherein $0.01 \leq x \leq 0.10$.

6. The composition of claim 1 wherein the rare earth is $Eu^{+3}$, $Er^{+3}$, or $Tb^{+3}$.

7. The composition of claim 1 wherein a=0.25 to 0.75, b=0.75 to 0.25, and c=0, $0.01 \leq x \leq 0.10$, and the rare earth is $Eu^{+3}$.

8. The composition of claim 1 wherein the rare-earth doped solid-state solution of alkaline earth fluorides is in the form of particles.

9. The composition of claim 8 wherein the particles are nano-scale.

10. The composition of claim 8 wherein the particles are micro-scale.

* * * * *